(12) United States Patent
Pahl

(10) Patent No.: US 6,820,765 B2
(45) Date of Patent: Nov. 23, 2004

(54) COMPACT COUNTERTOP FREEZER AND SOFT-SERVE METHOD

(76) Inventor: Richard Charles Pahl, 436 Date Palm Ct. NW, St. Petersburg, FL (US) 33703

( * ) Notice: Subject to any disclaimer, the term of this patent is extended or adjusted under 35 U.S.C. 154(b) by 135 days.

(21) Appl. No.: 10/337,804

(22) Filed: Jan. 7, 2003

(65) Prior Publication Data

US 2004/0129722 A1 Jul. 8, 2004

(51) Int. Cl.[7] ............................................... B67D 5/62
(52) U.S. Cl. ..................... 222/95; 222/103; 222/146.6; 222/390; 222/575
(58) Field of Search .......................... 222/1, 95, 103, 222/146.6, 333, 386, 390, 575

(56) References Cited

U.S. PATENT DOCUMENTS

| | | | | |
|---|---|---|---|---|
| 2,559,840 A | * | 7/1951 | Arthur | 222/146.6 |
| 2,889,949 A | * | 6/1959 | Nirenberg | 414/416.1 |
| 5,020,698 A | * | 6/1991 | Crossley | 222/386 |
| 5,232,027 A | * | 8/1993 | Tanaka et al. | 222/103 |
| 5,421,484 A | * | 6/1995 | Beach | 222/95 |
| 5,893,485 A | * | 4/1999 | McGill | 222/95 |
| 5,918,767 A | * | 7/1999 | McGill | 222/386 |
| 6,264,066 B1 | * | 7/2001 | Vincent et al. | 222/327 |
| 6,299,025 B1 | * | 10/2001 | Watanabe et al. | 222/146.6 |
| 6,435,377 B1 | | 8/2002 | Iwata | |
| 6,712,236 B1 | * | 3/2004 | McGill | 222/95 |
| 6,732,771 B2 | * | 5/2004 | Gispert Casino et al. | 222/326 |

* cited by examiner

*Primary Examiner*—Kenneth Bomberg
(74) *Attorney, Agent, or Firm*—Dorothy S. Morse

(57) ABSTRACT

A miniature, stand-alone, countertop freezer primarily for domestic use, and a soft-serve dispensing method, that allows extended storage of a food product at an optimum soft-serve sub-freezing temperature prior to dispensing. Its housing has a compact configuration for freezer-like insulated food product storage. However, when soft-serve dispensing is desired, the housing is vertically extended to expose a decorator pattern cap. A press plate in the upper portion of the housing is activated, either manually or otherwise, to push downwardly on the food product container, and thus force the food product through the pattern cap below the food product container and into a receiving vessel. The pattern cap may be a part of the dispenser or a part of the food product container. Although not limited thereto, use is contemplated with ice cream, sherbet, yogurt, sorbet, and other frozen dessert products. Alternative power supply sources are contemplated.

20 Claims, 3 Drawing Sheets

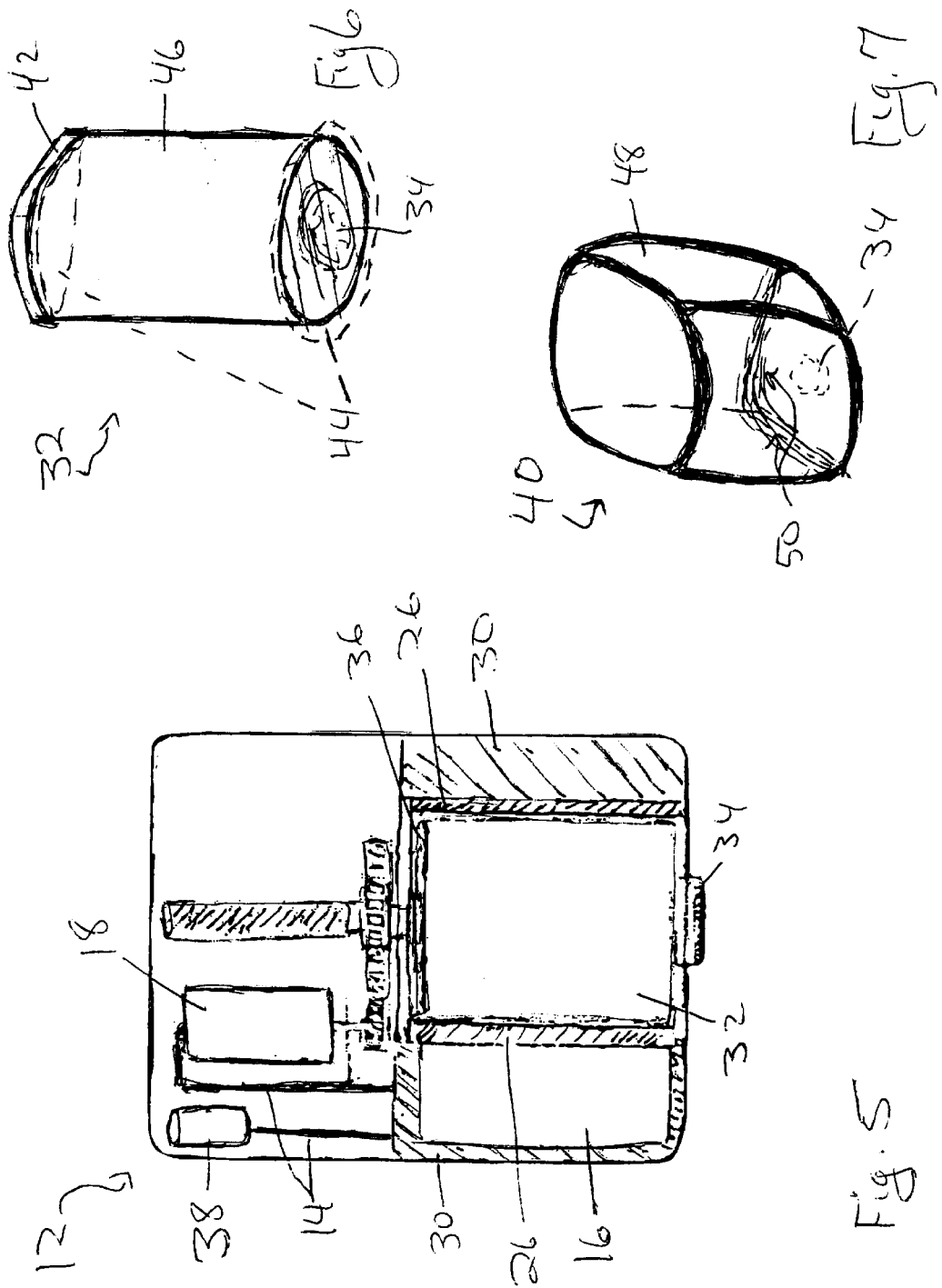

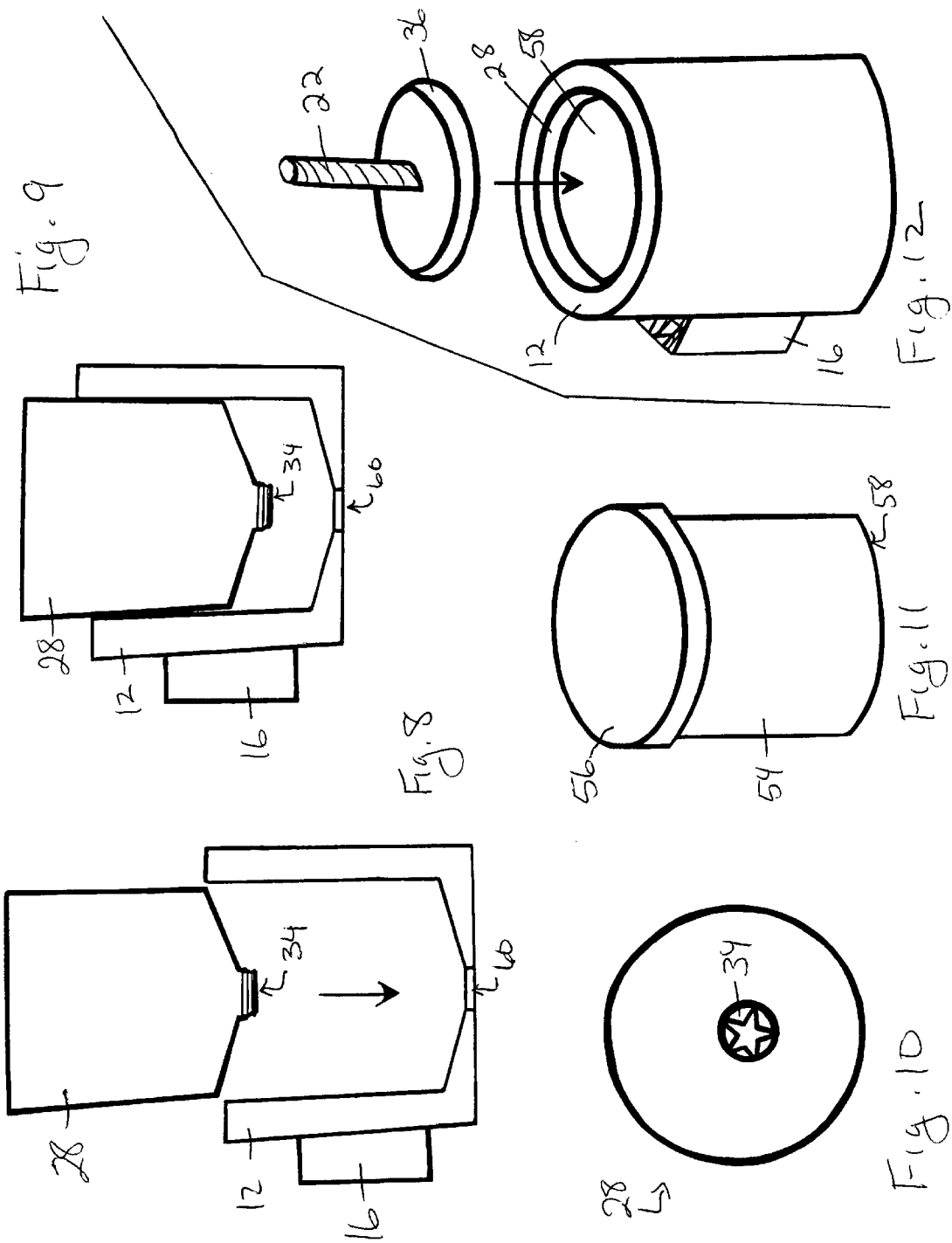

COMPACT COUNTERTOP FREEZER AND SOFT-SERVE METHOD

CROSS-REFERENCES TO RELATED APPLICATIONS

None.

BACKGROUND OF THE INVENTION—FIELD OF THE INVENTION

This invention relates to the field of soft ice cream freezers and dispensers, specifically to a miniature stand-alone countertop freezer for domestic use, and a dispensing method, which allows a food product intended for soft-serve dispensing to be sustained for an extended period of time, as needed, at the optimum soft-serve dispensing temperature, and thereafter dispensed totally or in part. It has no auger, but instead uses a vertical press for dispensing that can be operated by a variety of means, including a geared motor. Preferably a push-pack is used to contain the soft-serve food product, which optionally may be disposable, but containers in which frozen food is prepackaged can also be used for dispensing in combination with a liner or sleeve. To use the present invention, a frozen food product container or push-pack is taken from a freezer and inserted into a dispensing chamber within the upper portion of the housing, whereafter the dispenser warms the ice cream or other frozen food product in the dispensing chamber to the ideal temperature for soft-serve dispensing, approximately 18° F. In a short period of time, when the food product attains the desired temperature, the upper housing is vertically extended to reveal a dispensing opening and downward pressure is applied to the upwardly directed end of the container by a press plate causes the still frozen but softened food product to be dispensed from a pattern cap attached below the container. The housing remains in its vertically extended configuration until all dispensing is complete. It is then returned to its compact collapsed storage configuration where the remaining portion of the food product in the container or push-pack can be maintained for an extended period of time at the optimum soft-serve dispensing temperature. Thermoelectric, as well as conventional freezing means other than thermoelectric, can be used for maintaining the frozen state of the undispensed food product once it reaches the optimum soft-serve temperature. Applications can include, but are not limited to, use in dispensing ice cream, sherbet, frozen yogurt, sorbet, and other frozen dessert and food products.

BACKGROUND OF THE INVENTION— DESCRIPTION OF THE RELATED ART

Most people enjoy soft-serve frozen food products, however, known dispensers traditionally have been too large and too expensive for commonplace domestic use. Further, preparing them using a microwave or other commonly available kitchen tools and appliances is time consuming and messy, and typically results in an inconsistent product. In contrast, the present invention provides a compact, stand-alone, miniature countertop freezer/dispenser, primarily for domestic use, that functions to warm a frozen food product to an optimum temperature for soft-serve dispensing and thereafter maintain the product at that temperature for an extended period of time. It is quick to use, and requires little or no clean-up after dispensing. When the present invention is placed into its compact configuration, the food product container or push-pack therein is completely insulated, just as in a freezer. Instead of having an auger for dispensing, the present invention uses a vertical press.

The prior art thought to be the most closely related to the present invention is the invention disclosed in U.S. Pat. No. 6,435,377 to Iwata (2002). Both the Iwata invention and the present invention have a component moving within an insulated chamber that is used for dispensing a soft frozen food product from a pack. However, there are important structural and functional differences between the Iwata invention and the present invention. The Iwata invention is an insulated dispenser. In contrast, after dispensing use, the present invention can be collapsed into a compact storage configuration whereby the food product container or push-pack therein is completely insulated, just as in a freezer. Also, since it has a collapsed storage configuration, the present invention is able to occupy less food service area space between uses than the Iwata invention. The collapsed configuration of the present invention also allows it to more cost-efficiently maintain undispensed food product at the optimum soft-serve dispensing temperature than the Iwata invention. In addition, the pattern cap for the Iwata invention is located outside of the invention housing, near the top of its dispensing chamber and connected thereto by a conduit, while the pattern cap of the present invention is located below the food product container and positioned to communicate with the dispensing opening created when the housing is vertically extended, and is attached to the food product container, a liner or sleeve, or the bottom of the dispensing chamber. As a result of its structure, the piston in the Iwata invention pushes the food product upwardly for dispensing, while the press plate in the dispensing chamber of the present invention pushes the food product it contains downwardly to the pattern cap for dispensing. Also, an important part of the present invention is its ability to warm a frozen food product placed within its dispensing chamber to the optimum soft-serve temperature in a short period of time. The temperature sensor and thermoelectric/microprocessor unit of the present invention are not disclosed in the Iwata invention. There is no soft-serve dispensing system known that has the same features and components as the present invention, nor all of its advantages.

BRIEF SUMMARY OF THE INVENTION— OBJECTIVES AND ADVANTAGES

The primary object of this invention is to provide a miniature soft-serve dispenser for domestic use. It is also an object of this invention to provide a soft-serve dispenser that is able to warm a frozen food product to the optimum soft-serve temperature in a short period of time. A further object of this invention is to provide a soft-serve dispenser that is a stand-alone unit capable of operation with a variety of power sources, including battery power and photovoltaic means. It is a further object of this invention to provide a soft-serve dispenser that prevents continued dispensing of the remaining food product in a food container or push-pack once the amount of food product desired by the user has been obtained. It is also an object of this invention to provide a soft-serve dispenser that will maintain undispensed food product at the optimum soft-serve temperature for an extended period of time. A further object of this invention is to provide a soft-serve dispenser with a compact configuration for easy storage and countertop use, as well as one with aesthetic appeal. It is also an object of this invention to provide a soft-serve dispenser that is cost-efficient to operate. A further object of this invention is to provide a soft-serve dispenser that can be used with a variety of frozen food products and is easy to maintain.

As described herein, properly manufactured and used, the present invention is a soft-serve freezer/dispenser that can warm a solidly frozen food item, such as but not limited to, ice cream, sherbet, yogurt, and sorbet to the optimum soft-serve dispensing temperature of approximately 18° F., and thereafter chill the food product to maintain it at the desired temperature until all of it has been dispensed. The present invention is self-contained for stand-alone use and can be made to operate with alternating current, direct current, battery power, and photovoltaic means, or a combination of power sources. Although the present invention is capable of dispensing food product placed directly into its dispensing chamber, to avoid frequent cleaning of its dispensing chamber and vertical press, it is preferred for the food product to be purchased in a pre-sealed push-pack for the most time-efficient soft-serve dispensing and minimal clean-up after dispensing. An alternative option would be to use a thin sleeve or liner within the dispensing chamber that is configured to receive a pre-packaged ice cream container, such as but not limited to the substantially cylindrical 1.75 quart containers made from cardboard and commonly used for premium ice cream products. The readily removable lid would be removed from the container and discarded, and the container placed upside down within the sleeve/liner. Then, optionally if needed, the bottom of the cardboard packaging would be cut so that the press plate is able to push food product from its original package once it reaches the optimum soft-serve dispensing temperature. The decorative pattern cap through which present invention dispensing occurs, can be attached to the food product container, sleeve/liner, or the dispenser. Also, it is contemplated for the push-packs to be disposable, to eliminate the need for cleaning them, although sleeves/liners would generally not be disposable with the pattern cap attached thereto being the only part for which cleaning would be required. For such cleaning, it is contemplated and preferred for the pattern cap to be securely but removably attached to the sleeve/line. Further, since it is contemplated for the present invention dispenser to be used on a countertop in a domestic kitchen, office food service area, small restaurant, small motel, and the like, although not limited thereto the dispensing capacity of the present invention is preferably two liters or less, with the smallest dispensing capacity contemplated being approximately one-half pint. The housing extends vertically prior to dispensing and returns to its compact configuration between dispensing uses. The compact configuration facilitates efficient storage in crowded kitchens and food service areas where coffee makers, can openers, toasters, and microwave ovens compete for countertop space and also contributes to cost-efficient operation in maintaining the undispensed food product at the desired soft-serve sub-freezing temperature.

Although the food product chilling means is not limited thereto, a microprocessor controlled thermoelectric unit is preferred for maintaining the food product at the optimum soft-serve sub-freezing temperature for an extended period of time, as it would structurally allow a compact configuration and result in reduced insulation cost and energy consumption. Food products suited for soft-serve dispensing via the present invention include, but are not limited to, ice cream, sherbet, frozen yogurt, sorbet, and other frozen dessert and food products. Also, the vertical press of the present invention operates to dispense food product from a sealed push-pack or food product container without letting air back into it, preventing ice crystals from forming in the product. Further, although a geared motor can be used for the dispensing action, it is contemplated for dispensing to also be accomplished manually with a hand press or hydraulic press, as well as any other equivalent means. When a user has obtained a sufficient amount of soft-serve dispensed food product from the present invention, the press will stop pushing the product out of its container, and although the press plate does not return to its original position, it returns just enough to prevent pressure from being further applied to the food product to allow the undispensed amount to remain within the container for future use. Also, the vertical extension of the present invention housing immediately prior to use raises the food product container from its insulated cradle. Such raising also lifts the pattern cap into a position that allows a cone or dish to be placed below it as a receiving vessel for the dispensed food product. After dispensing, when the housing is returned to its original compact configuration, the food product container or push-pack is simultaneously lowered back into the cradle where it is completely insulated, just as in a freezer.

While the description herein provides preferred embodiments of the present invention freezer, it should not be used to limit its scope. For example, variations of the present invention, while not shown and described herein, can also be considered within the scope of the present invention, such as variations in the size of the dispensing chamber; the type of power supply used; the location of the batteries and photovoltaic means, when used; the thickness and type of insulation material used; the material from which the housing is made; and the thickness of the press plate and the material from which it is made and its surface characteristics. Thus, the scope of the present invention should be determined by the appended claims and their legal equivalents, rather than being limited to the examples given.

BRIEF DESCRIPTION OF THE SEVERAL VIEWS OF THE DRAWINGS

FIG. 5 is a sectional view of the most preferred embodiment of the present invention having the same components as in FIG. 4, and also including a battery power supply unit, and a press plate poised to begin dispensing of the soft-serve food product from a tubular food product container.

FIG. 6 is a perspective view of a first preferred push-pack embodiment contemplated for use with the present invention having a tubular configuration with a hollow interior through which the press plate can pass, as well as a pattern cap on one of its ends, an end cap on its opposite end, and optional protective films to seal the food product within the push-pack prior to dispensing and/or maintain the pattern cap in a sanitary condition prior to use.

FIG. 7 is a perspective view of a second preferred push-pack embodiment contemplated for use with the present invention having a pattern cap incorporated into its bottom surface and a resealable strip used for access to the food product therein prior to soft-serve dispensing.

FIG. 8 is a sectional view of a sleeve having a pattern cap on its lower end and starting to be inserted downwardly into the dispensing chamber of the present invention for use during dispensing between the interior wall of the dispensing chamber and the outside surface of a pre-packaged container of frozen food product.

FIG. 9 is a sectional view of the sleeve of FIG. 8 almost completely inserted into the dispensing chamber of the present invention.

FIG. 10 is a top view of the sleeve having an open upper end and a pattern cap centered through its opposing closed end.

FIG. 11 is a side view of a typical container used for packaging a frozen food product with its removable lid and a closed bottom end.

FIG. 12 is a perspective view of the dispensing chamber in the most preferred embodiment of the present invention having an inverted pre-packaged frozen food container centered therein and a sleeve positioned between the outside surface of the container and the inner wall of the dispensing chamber, and with a press plate ready for applying downward pressure against the bottom of the container to force food product through the pattern cap in the lower end of the sleeve.

DETAILED DESCRIPTION OF THE INVENTION

Figure 1:
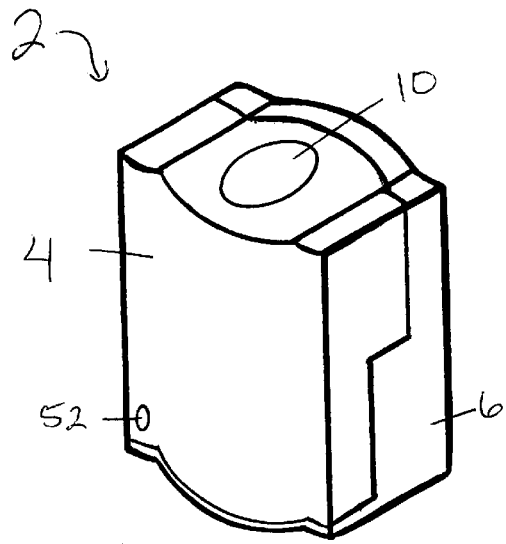
FIG. 1 is a perspective view of the most preferred embodiment of the present invention housing in its compact storage configuration between dispensing uses, wherein any food product contained therein is efficiently maintained at the optimum temperature for prompt soft-serve dispensing.

The present invention is a miniature stand-alone countertop freezer contemplated for use in a domestic kitchen, as well as in office food service areas, small restaurants, small motels, and the like. In addition to its housing 2 being used to maintain a food product, such as but not limited to ice cream, sherbet, yogurt, and sorbet, at an optimum sub-freezing temperature for soft-serve dispensing, the vertically extended configuration of its housing 2 creates an opening (such as dispensing opening 8 in FIG. 2) from which the food product can be dispensed into a receiving vessel (not shown), such as a cone or a dish. The extension of the upper portion 4 of housing 2 above its lower portion 6 can be accomplished manually or through automated means. The entire amount of food product in the dispensing chamber 12 may be dispensed at one time, or in the alternative a portion may remain undispensed and be maintained in a soft-serve state by housing 2 in its collapsed and compact storage configuration, which functions as a freezer. To reduce cleaning of dispensing chamber 12 during soft-serve dispensing, the food product is preferably pushed, squeezed, or rolled out of a container, such as but not limited to tubular push-pack 32 in FIG. 6 or collapsible push-pack 40 in FIG. 7. The pattern cap 34 through which the food product is dispensed, may either be connected to the dispensing chamber 12, a sleeve/liner such as is shown by the number 28 in FIG. 8, or to the food product container, such as the pattern caps 34 shown attached to push-packs 32 and 40 in FIGS. 6 and 7 respectively. When connected to dispensing chamber 12 or to sleeve/liner 28, pattern cap 34 would have to periodically be cleaned. Otherwise, if pattern cap 34 is connected to a push-pack and that push-pack is disposable, no post-dispensing cleaning is typically required. Optionally, instead of using push-packs 32 and 40, prepackaged ice cream and sherbet containers can also be used for dispensing of food product from chamber 12 in combination with liner/sleeve 28. Such prepackaged frozen food containers are commonly configured with a rectangular or circular cross-section. Therefore, it is considered within the scope of the present invention for its dispensing chamber 12 and press plate 36 to have a substantially circular cross-section for use with any container having a circular cross-section, or a dispensing chamber 12 and press plate 36 with a substantially rectangular cross-section for use with any container having a rectangular cross-section, as well as any other cross-sectional configuration that allows for efficient dispensing of a food product from dispensing chamber 12 using a vertical press application. Frozen food products used in the present invention are warmed to the desired temperature prior to dispensing, not the reverse, to ensure uniformity in the dispensed food product. Thereafter, through insulation and chilling means, the food product is maintained at the optimum soft-serve temperature of approximately 18° F. Dispensing can be manual or electronically controlled. Also, power for the heating and/or cooling of the food product in dispensing chamber 12 can be provided via an alternating current source, direct current source, battery power, photovoltaic means, and the like, or a combination of sources. Further, the means of forcing the food product through pattern cap 34 may be accomplished by alternative means, such as a press plate and the geared motor 18 shown in FIGS. 3 and 5, a hand press (not shown), hydraulic press (not shown), or any other equivalent pushing, squeezing, and/or rolling means. In addition, thermoelectric freezing means such as thermoelectric/microprocessor 16, as well as conventional freezing means other than thermoelectric, can be used for chilling the undispensed food product once it is initially warmed up to the optimum soft-serve temperature. Although not shown, it is contemplated for upper housing 4 and lower housing 6 to have active and/or passive means, as needed, for exhausting any heat generated by the freezing means used to maintain the food product within dispensing chamber 12 at the optimum soft-serve temperature.

Figure 2:
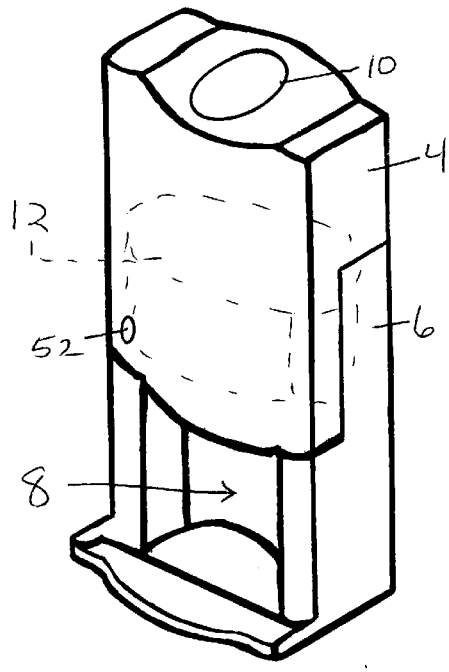
FIG. 2 is a perspective view of the most preferred embodiment of the present invention housing in its vertically extended configuration ready for dispensing use wherein a dispensing opening is exposed under the upper portion of the housing sufficient in size for a cone or dish to be placed therein as a receiving vessel for the dispensed food product.

FIGS. 1 and 2 show the extendable housing 2 of the most preferred embodiment of the present invention. In FIG. 1 the upper portion 4 of housing 2 is in its compact storage configuration. In this compact configuration, the dispensing chamber 12 shown in FIGS. 2–5 is completely insulated, and the present invention functions as a freezer. In contrast, FIG. 2 shows upper portion 4 vertically extended to reveal lower portion 6 and a dispensing opening 8 beneath upper portion 4 into which a cone or dish (not shown) can be placed as a receiving vessel for a dispensed food product (not shown). From here on, upper portion 4 will also be referred to as upper housing 4 and lower portion 6 referred to as lower housing 6. In both FIGS. 1 and 2, a release button 52 is shown on the outer surface of upper housing 4. The use of release button 52 is not critical, and would be employed when a spring-activated mechanism (not shown) is used to automatically raise upper housing 4 into its extended dispensing configuration. Although not shown, it is contemplated that an on-off switch could also be added to housing 2, as well as activation means for automated dispensing, or the two functions could be combined into one two-way switch or perhaps activated via release button 52 if it is made to be multi-functional. FIGS. 1 and 2 further show a photovoltaic unit 10 attached to the top surface of upper housing 4, while FIG. 2 shows dispensing chamber 12 hidden within upper housing 4 while it is in its raised position. The positioning of photovoltaic unit 10 is not critical as long as it is in a position for efficient and effective use. Also, to achieve the most compact configuration possible for housing 2, thus minimizing insulation cost and operating expense, as shown in FIG. 2 dispensing chamber 12 would substantially fill upper housing 4 with minimal vertical clearance for shaft 22 and motor 18 when they are used. Although not shown, it is considered within the scope of the present invention for upper housing 4 to optionally have a decorative design, decorative surface patterns thereon, a textured surface, informational markings thereon, and/or a different perimeter configuration, perhaps one that is more rounded than that shown in FIGS. 1 and 2. The thickness dimension of the material used for upper housing 4 and lower housing 6 should provide for a sturdy construction. However, for cost-effective manufacturing and portability, the thickness of upper housing 4 and lower housing 6 should not be increased above or below the levels at which an appropriate benefit is no longer derived. Also, although the materials used for manufacture can vary, it is contemplated for upper housing 4 and lower housing 6 in the most preferred embodiment of the present invention to be made from rugged and durable food-grade plastic, and for each to have a molded construction. Further, since the present invention is primarily contemplated for use with a food product, all components that come in close proximity to the food product container should be made from materials that are non-corroding, non-toxic, and easily cleaned. The length and width dimensions of upper housing 4 and lower housing 6 can also vary according to the shape and capacity of the dispensing chamber 12 used, and do not have to be limited to the proportions shown in FIG. 1. In addition, although not shown, it is contemplated for upper housing 4 to have a configuration that allows for easy exchange of push-packs 32 and 40. The type of access for such exchange is not critical, and may include but is not limited to an opening covered by a hinged door, an opening having a sliding cover, or opening with a snap-fit cover. Although positioning of such an opening centrally through the top surface of upper housing 4 would allow for easy lowering of a push-pack into dispensing chamber 12, such positioning is not critical and positioning of the access opening can be in any convenient place on upper housing 4.

Figure 3:
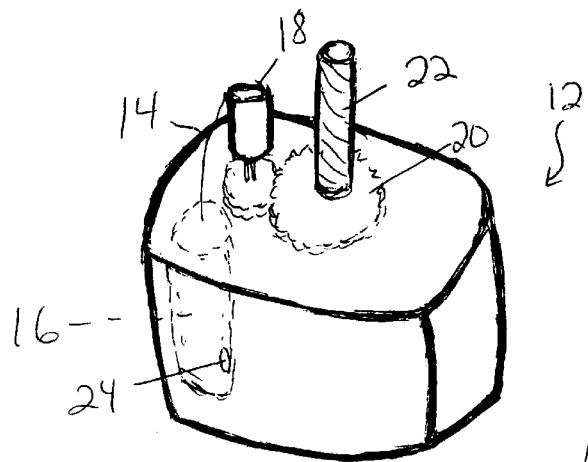
FIG. 3 is a perspective view of the dispensing chamber in the most preferred embodiment of the present invention and the thermoelectric/microprocessor unit used to initially heat the frozen food product placed therein to the optimum soft-serve temperature, as well as the preferred geared motor, shaft, and complementary gear used to operate the press plate shown in FIG. 5 to force food product through the pattern cap also shown in FIG. 5.
Figure 4:
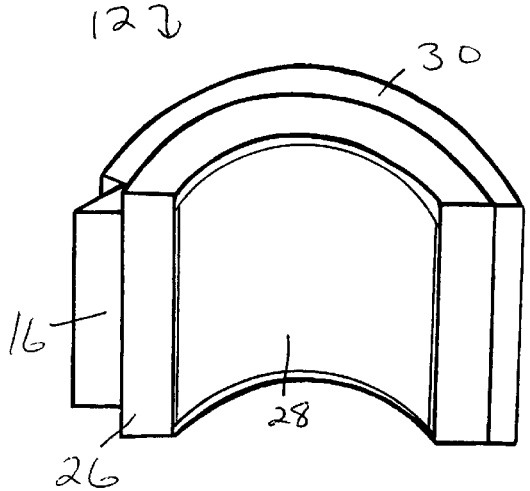
FIG. 4 is a sectional view of the dispensing chamber in the most preferred embodiment of the present invention having an outer insulating layer, an inner thermally conductive layer, and a thermoelectric/microprocessor unit in contact with the thermally conductive layer, with a sleeve/liner positioned adjacent to the heat transfer media and against which a food product or food product container would be placed.

FIGS. 3, 4, and 5 show dispensing chamber 12 in the most preferred embodiment of the present invention and the thermoelectric/microprocessor 16 used to initially heat the frozen food product placed therein to to raise its temperature to the optimum sub-freezing level for soft-serve dispensing. FIGS. 4 and 5 show dispensing chamber 12 having an outer insulating layer 30 and an inner thermally conductive layer 26, with thermoelectric/microprocessor 16 positioned immediately adjacent to inner thermally conductive layer 26. FIG. 3 also shows a temperature sensor 24 connected to thermoelectric/microprocessor 16 in a position where it is able to sense the temperature of inner thermally conductive layer 26 as an indirect indication of the temperature of the food product it maintains. In addition, positioned above dispensing chamber 12, FIGS. 3 and 5 show a geared motor 18, shaft 22, and complementary gear 20 used to operate the press plate 36 shown in FIG. 5 to push, roll, squeeze, or otherwise force food product through the pattern cap 34 below dispensing chamber 12, also shown in FIG. 5. The combined use of motor 18, shaft 22 and complementary gear 20 are not critical, and other means of pushing, squeezing, and/or rolling food product through pattern cap 34 are also contemplated, such as but not limited to a hand press (not shown), a hydraulic press, and other equivalent means. The positioning of geared motor 18, shaft 22, and complementary gear 20 each relative to the other is not critical and does not have to be limited to that shown in FIGS. 3 and 5. It can be varied as needed for cost-efficient manufacture and use. FIG. 5 shows a tubular push-pack 32 substantially filling dispensing chamber 12, between a press plate 36 connected to drive shaft 22 and pattern cap 34. Substantial filling is desired for most efficient temperature control of the food product while it remains within dispensing chamber 12. Thermally conductive layer 26 is kept at the proper temperature by thermoelectric/microprocessor 16 and temperature sensor 24, so basically there would only be air above the remaining product in the freezing chamber, which would be at the same temperature since air is a good insulator. Although in FIGS. 6 and 12 the cross-sectional configurations of the interior opening through dispensing chamber 12, as well as the cross-sectional configurations of press plate 36 and the food container such as push-pack 32, are shown to be circular, it is contemplated for other cross-sectional configurations to be used, such as but not limited to a rectangular configuration. However, the cross-sectional configurations of each should be substantially similar to the others used with it in the same present invention device for the most effective and efficient food product dispensing and temperature control. FIG. 4 also shows a sleeve/liner 28 positioned adjacent to thermally conductive layer 26. As shown in FIGS. 8–12, one use for a sleeve/liner 28 is to accommodate the use within dispensing chamber 12 of pre-packaged frozen food product containers, such as the ice cream container 54 shown in FIG. 11. Although not limited thereto, it is contemplated for sleeve/liner 28 to be made from a thin plastic material so that reduced or elevated temperatures created in thermally conductive layer 26 can be transferred to the food product held within sleeve/liner 28 so as to effectively maintain the food product at the desired optimum soft-serve temperature. In addition, FIGS. 4 and 5 show electrical wiring 14 connected between thermoelectric/microprocessor 16 and geared motor 18, and FIG. 5 shows a battery power supply unit 38 connected via electrical wiring 14 to thermoelectric/microprocessor 16.

Although only battery power supply unit 38 is shown, it is not contemplated for the power supply means of the present invention to be limited to the photovoltaic unit 10 shown in FIGS. 1 and 2 and battery power supply unit 38, and it is contemplated for other power supply means, such as but not limited to alternating current and direct current power supplies, to also be considered a part of the present invention.

FIGS. 6 and 7 show two preferred embodiments of food product containers, respectively tubular push-pack 32 and collapsible push-pack 40 for use with housing 2 in the present invention. Although only two configurations of push-pack food-product containers are shown, it is contemplated for the present invention to also include use of any other configuration of food product container that allows for pushing, squeezing, and/or rolling of the soft-frozen food product therein toward the present invention pattern cap 34 and dispensing into a receiving vessel (not shown), such as a cone or a dish. FIG. 6 shows tubular push-pack 32 having a generally cylindrical member 46 with a hollow interior, an end cap 42 on one of its opposing ends, and a pattern cap 34 extending through its opposite end. When push-pack 32 is used with the present invention, for most efficient dispensing of soft-frozen food product therefrom, it is contemplated for press plate 36 to have a diameter dimension substantially similar to that of push-pack 32, reduced only by the amount needed for clearance and unimpeded travel through the hollow interior of push-pack 32. FIG. 6 also shows a sanitary/protective film 44 being used over pattern cap 34 and under end cap 42. However, although it is contemplated for some precautionary means to be used in the present invention to seal and protect the food product held within cylindrical member 46, the type of precautionary means used is not critical, and it is also contemplated for means other than the end cap 42 and the sanitary/protective film 44 shown in FIG. 6 to be used for such protection prior to the time push-pack 32 is placed into dispensing chamber 12. In addition to its protective uses, removable sanitary/protective films 44 and end cap 42 permit user access to the hard-frozen food product within cylindrical member 46. Although not critical, it is preferred for upper sanitary/protective film 44 to remain in place during dispensing of food product from cylindrical member 46 to act as a protective barrier between press plate 36 and the food product. FIG. 7 shows a collapsible push-pack 40 from which food product can be pushed, squeezed, and/or rolled for dispensing through pattern cap 34. Although FIG. 7 shows collapsible push-pack 40 having a substantially rectangular configuration, its shape is not critical as long as it is complementary to the interior configuration of dispensing chamber 12 and the configuration of press plate 12 or equivalent means used for pushing, squeezing, and/or rolling food product therefrom and through pattern cap 34. FIG. 7 shows collapsible push-pack 40 having a flexible member 48, a pattern cap 34 extending through its bottom surface, and a resealable strip 50 configured for user access to the hard-frozen food product held within flexible member 48 should the user for any reason desire to remove some of the hard-frozen food product therefrom prior to soft-serve dispensing. However, the use of resealable strip 50 for such purpose is not critical. In the alternative, although not shown, in place of resealable strip 50 it is contemplated for a cap, resealable panel, or other access means through flexible member 48 to be used to reach the hard-frozen food product contained therein.

FIGS. 8–12 show a sleeve/liner 28 having a pattern cap 34 attached thereto and being inserted into dispensing chamber 12 for the containment of a pre-packaged frozen food product container 54 for pushing, squeezing, and/or rolling of food product from container 54. To use sleeve/liner 28 after its insertion within dispensing chamber 12, the lid 56 of a pre-packaged frozen food product container 54 is removed, and container 54 is inverted and placed within sleeve/liner 28 as it rests within the hollow interior of dispensing chamber 12. Bottom surface 58 is upwardly directed and adjacent to press plate 36. Although not shown, when bottom surface 58 is not easily separable from the remaining portion of container 54 as a result of the downward force of press plate 36, bottom surface 58 can be cut free therefrom in advance of dispensing action by use of a sharp kitchen knife or other sanitized cutting tool. In the most preferred embodiment of the present invention to provide the simplest, most cost effective, and most expedient dispensing use, the top end of sleeve/insert 28 would remain in a vertically 18 extending position, with press plate 36 directly engaging bottom surface 58. However, it is also contemplated for the top end of sleeve/insert 28 to be sealed prior to dispensing use. Further, it is contemplated for sleeve/liners 28 to be reusable, with only pattern cap 34 having to be covered or capped between uses when container 54 is removed from dispensing chamber 12. When pattern cap 34 is attached to sleeve/liner 28, attachment can be made using ribs, threads, a bayonet flange, or any other secure and efficient connection means. However, it is contemplated for the attachment between pattern cap 34 and sleeve/liner 28 to be removable so that if housing 2 is stored without food product for an extended period of time, pattern cap can be cleaned independently from sleeve/liner 28. The connection of pattern cap 34 to sleeve/line 28 is also helpful for keeping container 54 in place when most of the food product therein has been dispensed. Also, the material from which sleeves/liners 28 are made should allow unrestricted heat transfer from thermally conductive layer 26 to the food product within cardboard container 54. A preferred material for sleeves/liners 28 is plastic. FIG. 8 shows sleeve/liner 28 positioned over the upper end of dispensing chamber 12 with pattern cap 34 downwardly depending from the bottom of sleeve/liner 28. FIG. 9 shows sleeve/liner 28 in a lowered position from that is FIG. 8 and substantially within dispensing chamber 12, near to its usable position where pattern cap 34 would extend through the bottom opening 60 in dispensing chamber 12. In both FIGS. 8 and 9, sleeve/liner 28 substantially fills dispensing chamber 12. This assists in efficient temperature adjustment via thermally conductive layer 26. The order of performing the step of inserting container 54 into sleeve/liner 28 and the step of inserting sleeve/liner 28 into dispensing chamber 12 is not critical as long as in the most preferred embodiment when pattern cap 34 is attached to sleeve/liner 28, the pattern cap 34 is able to be aligned with and fully inserted through bottom opening 60 prior to dispensing use. FIG. 10 shows pattern cap 34 as seen through the open top end of sleeve/liner 28, with pattern cap 34 being centered through the opposed bottom end of sleeve/liner 28. The star configuration for pattern cap 34 is preferred, but not critical. FIG. 11 shows pre-packaged frozen food product container 54 with its removable lid 56 and bottom surface 58, while FIG. 12 shows inverted container 54 fully within the hollow interior of dispensing chamber 12 with sleeve/liner 28 between container 54 and the interior wall of dispensing chamber 12. It is preferred that container 54 and sleeve/liner 28 substantially fill the hollow interior of dispensing chamber 12, for most effective temperature adjustment by thermoelectric/microprocessor 16 of the food product positioned within container 54.

It is contemplated for at least one preferred embodiment of the present invention to be completely portable. Also, it is contemplated for at least one preferred embodiment to have completely manual operation for the extension of housing 2 and dispensing of food product from pattern cap 34 and for another preferred embodiment to have these same operations being automated in response to some combination of user activation and release button or switch. Further, although not shown in the accompanying illustrations, an on-off switch could be used through housing 2 to engage thermoelectric/microprocessor 16, instead requiring the 1 termination of electrical activity to be accomplished as a result of battery removal or the disconnection of an electrical cord. If a 1.75 quart capacity container 54 is used with the present invention, it is contemplated that sleeve/liner 28 would be approximately 6.5 inches in height, which would result in a height for housing 2 of approximately thirteen inches when the stroke of press plate 36 is the same height of container 54. Although the manufacture of housing 2 and other components are not limited to any one type of material, each should have sturdy and durable construction for trouble-free repeat use over an extended period of time.

I claim:

1. A freezer for maintaining a frozen food product at an optimum soft-serve temperature and dispensing such product into a receiving vessel, said freezer comprising:
   an insulated housing having an upper portion and a lower portion, said upper and lower portions interacting with one another to create a compact collapsed storage configuration and a vertically extended dispensing configuration;
   thermally conductive means positioned centrally from said insulated housing;
   temperature adjusting means adapted for raising and lowering the temperature of said thermally conductive means;
   power supply means adapted for operation of said temperature adjusting means;
   a dispensing chamber configured for containing a food product, said dispensing chamber also positioned so that it is in contact with and substantially surrounded by said thermally conductive means;
   temperature sensing means adapted for monitoring the current temperature of the food product within said dispensing chamber;
   pattern cap dispensing means positioned through the bottom end of said dispensing chamber; and
   pressure means adapted for moving varying amounts of food product through said pattern cap dispensing means and beyond said dispensing chamber.

2. The freezer of claim 1 wherein said housing is selected from a group consisting of manually extended housings and housings with automated extension and said pressure means is selected from a group consisting of manual pressure means and automated pressure means.

3. The freezer of claim 1 wherein said temperature adjusting means comprises heating and cooling means selected from a group consisting of thermoelectric means, microprocessor controlled thermoelectric means, and freezing means comprising a compressor.

4. The freezer of claim 1 wherein said pressure means comprises a press plate and geared motor.

5. The freezer of claim 4 wherein said press plate does not return to its original position after dispensing operation, but returns just enough to prevent pressure from being further applied to the food product.

6. The freezer of claim 1 wherein said power supply means is selected from a group consisting of batteries, alternating current power sources, direct current power sources, and photovoltaic means.

7. The freezer of claim 1 further comprising sleeve means adapted for use in said dispensing chamber and for holding a food product container, said sleeve means also substantially filling said dispensing chamber.

8. The freezer of claim 7 wherein said pattern cap dispensing means is selected from a group consisting of pattern caps attached to a liner, pattern caps attached to a sleeve, pattern caps attached to said dispensing chamber, and pattern caps attached to a food product container.

9. The freezer of claim 1 wherein the maximum capacity of said dispensing chamber is approximately two liters and the minimum capacity of said dispensing chamber is approximately one-half pint.

10. The freezer of claim 1 wherein said pressure means is further adapted so as not to allow ice crystals to develop in the food product while it waits in the dispensing chamber prior to dispensing.

11. The freezer of claim 1 wherein said pressure means further comprises at least one press device selected from a group consisting of press devices that push, squeeze, and roll a food product from a container.

12. A stand-alone miniature countertop freezer for domestic use that maintains a frozen food product at an optimum soft-serve temperature and dispenses such product from a container into a receiving vessel, said freezer comprising:
    a compact insulated housing having an upper portion and a lower portion, said upper and lower portions interacting with one another to create a compact collapsed storage configuration and a vertically extended dispensing configuration that reveals a dispensing opening sufficient for insertion of a receiving vessel for the dispensed product;
    thermally conductive means positioned centrally from said insulated housing;
    temperature adjusting means adapted for raising and lowering the temperature of said thermally conductive means;
    power supply means adapted for operation of said temperature adjusting means;
    a dispensing chamber configured for containing a food product, said dispensing chamber also positioned so that it is in contact with and substantially surrounded by said thermally conductive means;
    temperature sensing means adapted for monitoring the current temperature of the food product within said dispensing chamber;
    pattern cap dispensing means positioned through the bottom end of said dispensing chamber; and
    pressure means adapted for moving varying amounts of food product through said pattern cap dispensing means and beyond said dispensing chamber.

13. The freezer of claim 12 wherein said dispensing chamber is adapted to receive food product containers selected from a group consisting of push-packs, cylindrical containers, rectangular containers, and pre-packaged frozen food containers.

14. The freezer of claim 12 wherein said housing is selected from a group consisting of manually extended housings and housings with automated extension; said pressure means is selected from a group consisting of manual pressure means and automated pressure means and further comprises at least one press device selected from a group consisting of press devices that push, squeeze, and roll a food product from a container; said temperature adjusting means comprises heating and cooling means selected from a group consisting of thermoelectric means, microprocessor controlled thermoelectric means, and freezing means comprising a compressor; and said power supply means is selected from a group consisting of batteries, alternating current power sources, direct current power sources, and photovoltaic means.

15. The freezer of claim 12 wherein after dispensing use said pressure means returns sufficiently to prevent pressure from being further applied to the food product.

16. The freezer of claim 12 further comprising sleeve means adapted for use in said dispensing chamber and for holding a food product container, said sleeve means also substantially filling said dispensing chamber.

17. The freezer of claim 16 wherein said pattern cap dispensing means is selected from a group consisting of pattern caps attached to a liner, pattern caps attached to a sleeve, pattern caps attached to said dispensing chamber, and pattern caps attached to a food product container.

18. A method for freezing and dispensing a food product at an optimum soft-serve temperature, said method comprising the steps of:

providing a freezer having an insulated housing with an upper portion and a lower portion movable relative to one another from a vertically extended configuration to a compact collapsed storage configuration, a thermally conductive medium, a temperature adjusting member, power supply means, a dispensing chamber, temperature sensing means, a pattern cap, a vertical press, and a frozen food product in a container;

placing said upper and lower portions of said housing into said collapsed storage configuration;

activating said power supply means;

placing said container in said dispensing chamber;

allowing said temperature adjusting member thorough said thermally conductive medium to warm said frozen food product in said container until said temperature sensing means detects the optimum temperature for soft-serve dispensing;

vertically extending said upper portion of said housing above said lower portion until a dispensing opening is revealed and said pattern cap is exposed for dispensing use;

activating said vertical press until the amount of food product desired has been dispensed through said pattern cap; and optionally if some food product remains undispensed, lowering said upper portion of said housing until said housing is returned to said collapsed storage configuration so that said thermally conductive medium, said temperature adjusting member, said temperature sensing means, and said insulated housing work together to maintain said undispensed food product at the optimum soft-serve temperature until dispensing occurs.

19. The method of claim 18 further comprising the step of providing sleeve means, and the steps of inserting said sleeve means into said dispensing chamber and placing said container within said sleeve means.

20. The method of claim 19 wherein said container of food product is a pre-packaged container with removable lid, and further comprising the steps of removing said lid, inverting said pre-packaged container, and placing said inverted prepackaged container within said sleeve means.

* * * * *